US 6,476,574 B1

(12) United States Patent
Nilsson et al.

(10) Patent No.: US 6,476,574 B1
(45) Date of Patent: Nov. 5, 2002

(54) METHOD AND DEVICE FOR CONTROLLING THE MOVEMENT OF A MOVABLE PART

(75) Inventors: Mats Nilsson, Solna (SE); Bohao Liao, Sollentuna (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/763,526

(22) PCT Filed: Aug. 25, 1999

(86) PCT No.: PCT/SE99/01450

§ 371 (c)(1),
(2), (4) Date: Feb. 26, 2001

(87) PCT Pub. No.: WO00/12270

PCT Pub. Date: Mar. 9, 2000

(30) Foreign Application Priority Data

Aug. 26, 1998 (SE) .............................................. 9802853

(51) Int. Cl.$^7$ ................................................. B25J 9/18
(52) U.S. Cl. ............. 318/568.11; 318/567; 318/568.21
(58) Field of Search ........................... 318/568.11, 567, 318/568.21, 569; 700/275; 414/729

(56) References Cited

U.S. PATENT DOCUMENTS

| 4,806,066 A | * | 2/1989 | Rhodes et al. ............... 318/568 |
| 6,275,748 B1 | * | 8/2001 | Bacchi et al. ................ 700/275 |

FOREIGN PATENT DOCUMENTS

EP        0 630 559 A1    12/1994

* cited by examiner

Primary Examiner—Karen Masih
(74) Attorney, Agent, or Firm—Young & Thompson

(57) ABSTRACT

A method and device (1) for controlling the movement of a movable part such as a robot arm (3) in a milking robot (1). A control (7) controls the movement of the arm (3) from an actual position (Pxa, Pya, Pza) to a desired position (Pxd, Pyd, Pzd) A detector (45, 47, 49) detects the actual position of the robot arm (3) and transmits signals corresponding to the actual position to the control (7). The predicted position (Pxp, Pyp, PyP), that the robot arm (3) will pass through as it moves from the actual position to the desired position our model (S). The control (7) makes a comparison (S) of the actual positions of the arm (3) against to the predicted positions, and the movement of the robot arm (3) is modified if its actual position at any time differs by more than a predetermined amount from the predicted position at the same time.

17 Claims, 2 Drawing Sheets

METHOD AND DEVICE FOR CONTROLLING THE MOVEMENT OF A MOVABLE PART

TECHNICAL FIELD OF THE INVENTION

The present invention relates to a method and a device of the type mentioned in the preambles of the independent claims for controlling the movement of moving parts in a milking machine.

DESCRIPTION OF RELATED ART

Automatic milking machines are known in which a robot arm is used to move various attachments such as teat cups and cleaning devices from docking stations on for example the frame of the machine to working positions, for example under the udder of the animal being milked. The movement of the robot arm is controlled by a computer, which determines a desired position for the attachment and operates actuators on the arm in a controlled manner in order to bring the attachment to the desired position. The computer determines the distance in the x-, y-, z- and rotational axes between the current position and the desired position and commands each of the x-, y-, z-axes and rotational actuators to respectively extend, retract or rotate the necessary amount in order to move the robot arm to the desired position. The computer is provided with a programme, which determines the speed of extension retraction of the actuators and the computer can thereby predetermine how much time the movement from the actual position to the desired position should take. At the end of the predetermined time the computer compares the actual position of the attachment against its desired position. If the actual position is not the same as the desired position the computer determines that an error has occurred and can take further corrective action or produce an alarm signal.

EP 0 300 115 A1 discloses a device for automatic milking of cows, in which a memory contains data on usual teat positions used for locating teats on a cow to be milked. This data on teat positions is continuously corrected in response to changes in conditions.

A problem occurs if the robot arm is in contact with an obstacle, such as an operator or a part of an animal, which is in the path of the robot arm. It is possible that injuries can be caused or aggravated during the time between the contact occurring and the end of the predetermined time.

SUMMARY OF THE INVENTION

An object of the present invention is to provide a method and device which does not suffer from the problems of the prior art devices.

According to the invention, the above problem is solved by a method and device having the features stated in the characterising parts of the independent claims. The invention thus relates to a method and a device comprising modelling means for calculation of a predicted path that a robot arm will follow when moving from an actual position to a desired position and comparing means for comparing the actual path of the robot arm against the modelled predicted path.

BRIEF DESCRIPTION OF THE DRAWINGS

The invention will be illustrated by examples of embodiments and by means of the appended drawings in which.

DETAILED DESCRIPTION OF EMBODIMENTS

Figure 1:
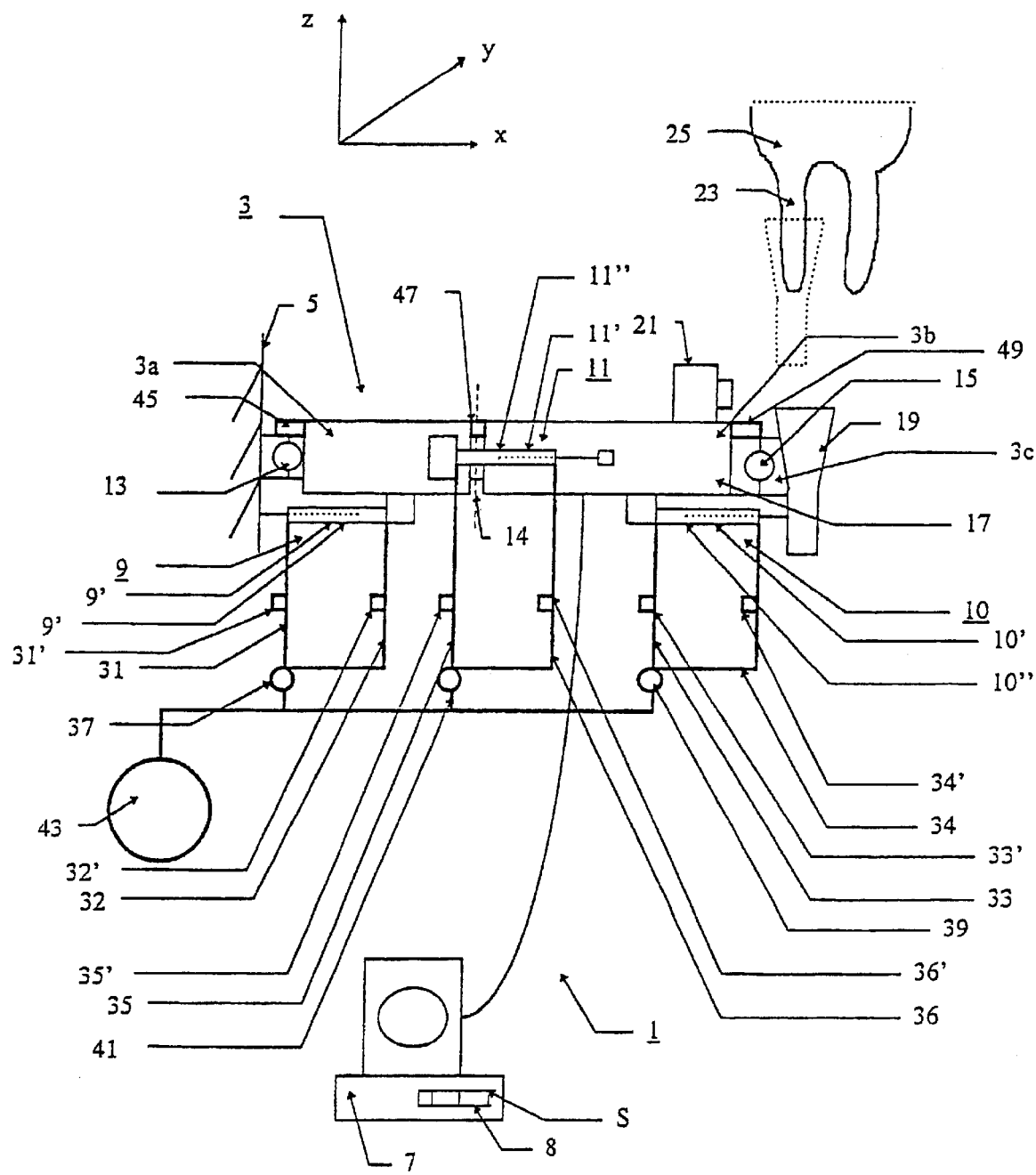
FIG. 1 shows schematically a control device in accordance with the present invention.

FIG. 1 shows schematically a milking robot 1 with a robot arm 3. The robot arm 3 is fixed to a frame 5 and is connected to a control means such as a computer 7. The computer 7 has a memory 8 containing operating software, which controls the movement of the robot arm as described later. The robot arm 3 is manoeuvrable in the x-, y- and z-axes by suitable actuating means. In this figure, for the sake of simplicity of illustration, only three actuating means are shown, namely pneumatic actuators 9, 10, 11 and respective hinged joints 13, 14, 15, but it is of course possible to use any suitable number and type of actuating means. Thus, the robot arm 3 can for example be provided with telescopic joints in addition to or instead of hinged joints. The robot arm 3 is provided at one end 17 with tool means, for example a washing means, brushing means or, as shown here, a teat cup 19 and sensing means like for example a camera 21. Actuators 9, 10, 11 each comprise a cylinder, 9', 10', 11' respectively, which encloses a movable piston, 9", 10", 11" respectively. Each cylinder 9', 10', 11' is supplied with compressed air by a pair of supply lines, respective 31 and 32, 33 and 34, 35 and 36, which are connected to the respective cylinders 9', 10', 11' on opposite sides of the respective pistons 9", 10", 11". Each supply line has a pressure sensor 31', 32', 33', 34', 35', 36', which can measure the differential pressure in the respective supply lines 31–36 and can provide a pressure signal to the computer 7. Each pair of supply lines 31 and 32, 33 and 34, 35 and 36 are connectable by respective valves 37, 39, 41 to an actuating fluid supply, e.g. a compressed air supply 43. The valves 37, 39, 41 are controllable by a control means such as the software in the computer 7 and are so arranged that either, both or none of the respective supply lines 31–36 are connected to the compressed air supply 43. Each joint 13, 14, 15 respectively has an associated position sensing means 45, 47, 49, which could be for instance rotary encoders, which provides a position signal possibly used to sense how much the robot arm 3 has rotated around each joint 13, 14, 15. It further outputs this information to the computer 7 so that subsequently the position of the end 17 of the robot arm 3 and its tool means 19 can be calculated. Alternatively the position sensing means could be, for example linear encoders, which determine the actual position of the respective pistons 9", 10", 11" in relation to the cylinder 9', 10', 11' of each actuator 9, 10, 11 or could be used a combination or linear and rotary encoders. Alternatively the position of the robot arm end 17 could be directly sensed by, for example ultra-sonic detectors, laser detectors, video cameras or the like. The software in the computer 7 controls the movement of the robot arm 3 by controlling the opening and closing of valves 37, 39, 41. This is done in order to control how the compressed air acts on the pistons 9", 10", 11" in a way which is familiar to persons skilled in the operation of pneumatic actuators and which will not be described more closely here. By appropriate controlling of the valves 37, 39, 41 the pistons 9", 10", 11" can be made to extend and retract and the robot arm 3. Hence the attached teat cup 19 can be moved to any desired position, e.g. as shown in dotted lines, to a position around a teat 23 on an udder 25 of an animal being milked. The position signals from the position sensing means 45, 47, 49 can be used by the computer as feedback signals in order to ensure that a teat cup 19 has reached its desired position.

A milking robot in accordance with the invention is provided with control means which move the robot arm and which is provided with means for detecting the presence of obstacles which prevent the robot arm from travelling a desired path to a desired position. In a first embodiment of the invention these control means comprises software (S) comprising a robot arm control program and a mathematical model stored in the computer 7. This model describes the dynamics of the robot arm 3, in other words it describes how the robot arm 7 will move when starting from any position when the actuators are provided with compressed air. It contains a algorithm, preferably a Kalman filter, which can predict how the robot arm will move in response to the compressed air applied to the pistons 9", 10", 11". This algorithm produces a model of the desired path, i.e. the position of the robot arm at selected intervals of time, that the robot arm is intended to follow when moving from its actual position to its desired position. The computer controls the movement of the robot arm in the following way: in order to simplify the description, the invention will be illustrated by an example in which the control means of the robot arm comprises a computer 7 and software (S) contained in a memory 8 in the computer, although it is conceivable that the control function could be performed using a hardwired control means. The software also contains a program for modelling the dynamics of the movement of the robot arm. The control program controls the movement of the robot arm 3 by sending instructions to the control valves of the pneumatic actuators 9, 10, 11 of the robot arm 3. Preferably the control program includes information of obstacles in the region of the robot arm 3 which can be taken into account when planning the movement of the robot arm 3. The information is included in order to prevent the robot arm 3 being commanded to collide with for instance the frame 5 of the milking machine 1. The instructions from the control program contain information on how far each actuator 9, 10, 11 shall extend or retract and at what rate of movement (i.e. the speed) the extension or retraction is to take place at. Thus when it is desired to move the robot arm 3, the computer 7 determines the actual position of the robot arm 3 by using the actual position signals produced by position sensing means 45, 47, 49. The computer 7 then determines the desired position of the robot arm 3 and calculates the displacements in the x-, y- and z-axes needed to bring the robot arm 3 to the desired position. The computer 7 then determines the required rate of movement in each axis in order to safely move the robot arm 3, i.e. the robot arm 3 should not be moved too quickly as this may scare an animal in the milking machine 1. The pressure differences across the respective pistons 9", 10", 11" required to achieve these rates of movement are then calculated. The valve 37, 39, 41 positions required to produce these calculated pressure differences are calculated from the model of the dynamics of the robot arm 3 and the valves 37, 39, 41 are then actuated to order to produce these calculated pressure differences. As the robot arm 7 moves its actual position in each of the x-, y- and z-axes, Pxa, Pya, Pza are measured by the computer 7. The computer continuously monitors, or samples at short intervals, the actual position signals produced by position sensing means 45, 47, 49 and the actual pressures in the supply lines 31–36 as sensed by pressure sensing means 31'–36'. The computer 7 also calculates, at short intervals, by means of a position algorithm in its software the predicted position of the robot arm 3 in each of the x-, y- and z-axes Pxp, Pyp, Pzp. If the actual position in at least one axis differs by more than a predetermined allowed amount from the predicted position for that instant of time, this could be an indication that the movement of the robot arm 3 is obstructed by an obstacle.

Subsequently the computer 7 can command appropriate action. This could for example be a check function in which the actual and predicted positions are measured and/or calculated again and compared. If there is still a difference, which is greater than the predetermined amount then other action could be taken such as for example:

sounding an alarm;

stopping movement of the robot arm 3;

returning the robot arm 3 to an idle position near to, or outside, the frame 5 in order to try to take it out of contact with the obstacle;

reversing the robot arm 3 along its latest path in order to take it out of contact with the obstacle; and/or opening one or more of the valves 37, 39, 41 so that the relevant pistons 9", 10", 11" are exposed to atmospheric pressure thereby allowing the robot arm 3 to move freely in one or more directions order to prevent injury if the obstacle is an animal or an operator, etc.

In the event that the obstacle is an animal it is possible that after a short period of time has elapsed the obstacle will no longer be present. In this case the computer 7 could first undertake one of the above-mentioned actions and then command the robot arm 3 to continue its original movement.

Figure 2:
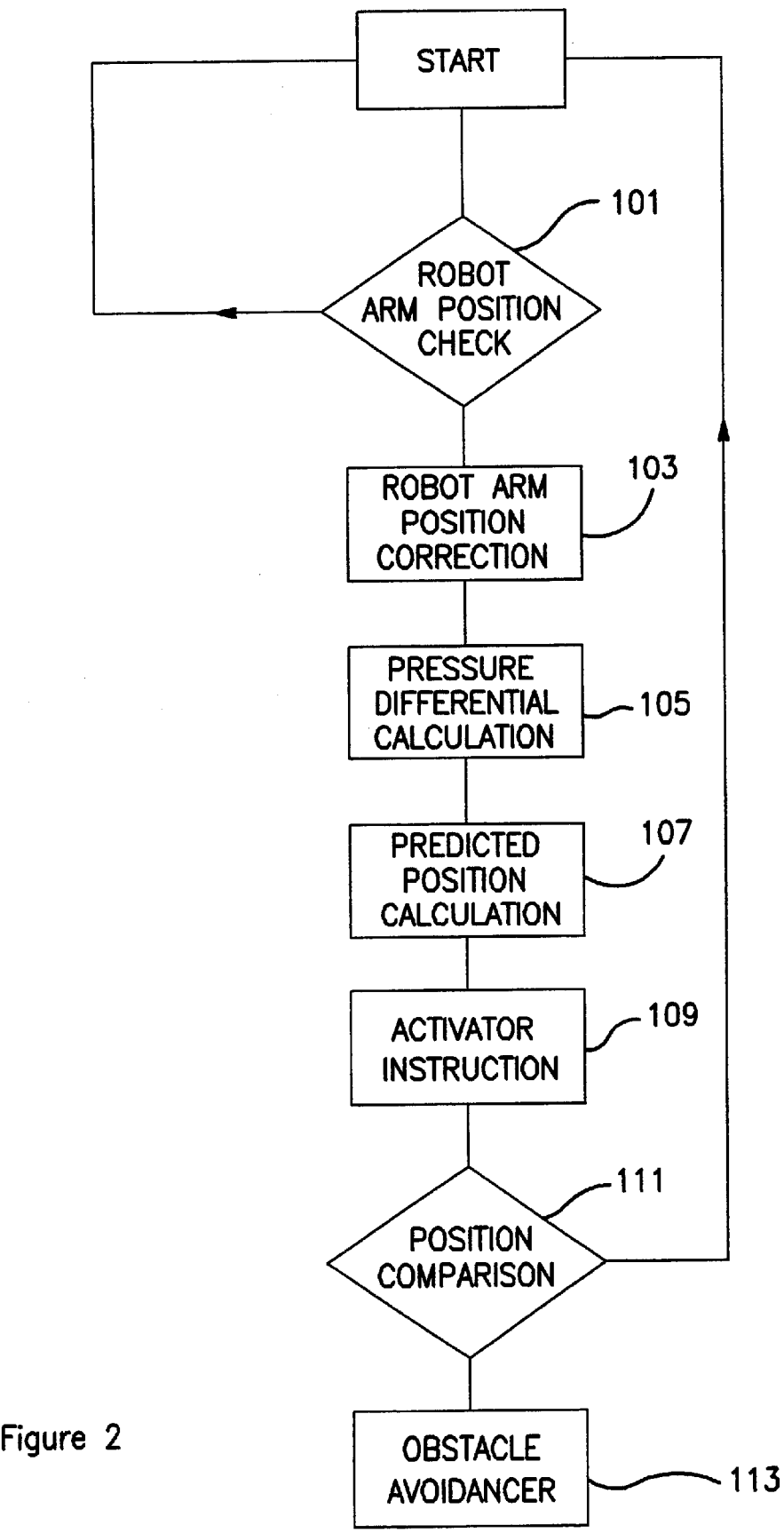
FIG. 2 shows an example of a flow diagram for a method in accordance with the present invention.

A flow diagram for a method for controlling a robot arm in accordance with the invention is shown in FIG. 2. The flow diagram relates to movements in one axis e.g. the x-axis and it is to be understood that the y-axis and z-axis can be controlled in a similar manner. During use at regular time intervals of for example 20 ms, i.e. 50 times per second, the computer 7 starts the programme, which compares the actual position of the robot arm in the x-, y- and z-axes with the desired position of the robot arm in the in the x-, y- and z-axes. In a first step 101 the software (S) of the computer 7 checks if there is a requirement to move robot arm 3 from its actual position Pxa(t=1) in the x-axis to a desired position Pxd in the x-axis i.e. the computer checks if the actual position Pxa(t=1) is the same as the desired position Pxd. If it is the same then the computer returns to the start and recommences the programme at the next time interval. If the actual position Pxa(t=1) in the x-axis is not the same as the desired position Pxd then the computer goes to step 103. In step 103 the required displacement dPr for the next time interval in order to bring the actual position Pxa(t=1) closer to the desired position Pxd of the robot arm in the x-axis is calculated by the computer. In step 105 the pressure differential and rate of change of pressure differential required across the piston of the x-axis actuator in order to achieve the required displacement and velocity of displacement are calculated. In step 107 the algorithm calculates the predicted position Pxp(t=2) of the robot arm 3 which the robot arm 3 should have reached after the application of the pressure differential and rate of change of pressure differential calculated in step 105. In step 109 the calculated pressure differential and rate of change of pressure differential are applied to the actuator. In step 111 the software (S) compares the new actual position Pxa(t=2) against the predicted position Pxp(t=2). If the new actual position Pxa(t=2) is within a predetermined error distance of the predicted position Pxp(t=2) then it can be assumed that there are no obstacles restricting the movement of the robot arm in the x-axis and the computer returns to step 101. If the new actual position Pxa(t=2) is not within a predetermined error distance of the predicted position Pxp(t=2) then it can be assumed that there is an obstacle restricting the movement of the robot arm in the x-axis. In this embodiment the computer then goes to step 113 and performs the appropriate action as mentioned earlier.

The predetermined error distance can be provided by an operator of the milking robot or can be calculated by the computer (7). It is furthermore possible to have several different predetermined error distances, which can depend on for example:

the working state of the machine (e.g. when no animals are present then higher speeds and higher errors could be permitted);

the actual position of the robot arm (e.g. when the arm is near to the expected position of an animal then smaller errors would be permitted then when the robot arm is near to its rest position by the frame of the device); and/or the age of the device (e.g. as the device becomes worn then it can be expected that positional errors become more frequent due to the model of the movement of the robot arm will no longer accurately model the actual movement of the robot arm and therefore position errors will occur even when there are no obstacles present. A larger permitted error distance would therefore be necessary to avoid frequent false alarms).

In another embodiment (not shown), the computer could first perform a check function in which the actual and predicted positions are measured respectively calculated again and compared. If there is still a difference, which is greater than the predetermined amount then the computer could go to step 113.

In another embodiment of the invention (not shown), the computer also monitors the pressures in the supply lines 31–36. In the event that a soft object obstructs the robot arm 3, such as for example a soft part of an animal it is possible that the movement of the arm is not immediately prevented. This because the robot arm 3 may be able to overcome the resistance offered by the obstruction, deform the obstruction and therefore an error between the predicted position and the actual position will not be detected. This is undesirable as the continued motion of the robot arm 3 may damage age the obstruction. However if an obstacle resists the movement of the robot arm 3 then the pressures in one or more of the supply lines will be higher than in the case when no obstacle resists the movement. Therefore in this embodiment the predicted pressures in the supply lines 31–36 are also predicted by the control means, i.e. computer 7, and compared against the actual pressures sensed by pressure sensors 31'–36'. If the computer 7 detects that one or more actual pressures deviate from the predicted pressure then it can command appropriate action as mentioned above.

While the invention has been illustrated with a robot arm movable in all three orthogonal axis it is conceivable to have a robot arm which is not movable in the z-axis. In this case a vertically displaceable tool holder mounted onto the robot arm could provide the movement required in the z-axis.

While the invention has been illustrated using an example, where the actual position of the robot arm is compared against a desired position, it is naturally also possible to compare the actual position and the desired position of for example the tool attached to the robot arm or some movable part of the apparatus.

The invention has been illustrates using software to perform the comparison and modelling functions but it is also conceivable within the scope of the invention to perform these function using hardware comparison and modelling means.

The invention is not limited to controlling the movement of a robot arm in a milking machine but can be applied to any moving parts in a milking apparatus which are controlled, e.g. gates, head pushers, mangers, mechanical sensors and the like.

What is claimed is:

1. A method for controlling the movement of a movable part such as a robot arm (3) in a milking robot (1) comprising control means (7) for controlling the movement of said robot arm (3) from a position from which it starts, to a desired final position (Pxd, Pyd, Pzd), robot arm position detecting means (45, 47, 49) which detect the actual position of said robot arm (3) and which transmits signals corresponding to said actual position (Pxa, Pya, Pza) to said control means (7), characterised by the steps of:

a) checking if the actual position (Pxa, Pya, Pza) differs from the desired final position (Pxd, Pyd, Pzd) by a distance which is greater than a predetermined distance, b) if the actual position (Pxa, Pya, Pza) differs from the desired final position (Pxd, Pyd, Pzd) by a distance which is greater than a predetermined distance, calculating a predicted position (Pxp, Pyp, Pzp), in which the robot arm (3) should be after a selected time interval, as it moves from said actual position (Pxa, Pya, Pza) towards said desired final position (Pxd, Pyd, Pzd), c) after said time interval comparing said predicted position (Pxp, Pyp, Pzp) with the actual position (Pxa, Pya, Pza), and d) if the actual position (Pxa, Pya, Pza) of said robot arm (3) differs from said predicted position (Pxp, Pyp, Pzp) by a distance which is less than a predetermined allowed error distance, repeating step a) above and the steps following upon it.

2. A method as claimed in claim 1, characterised by the step of: if the actual position (Pxa, Pya, Pza) of said robot arm (3) differs from said predicted position (Pxp, Pyp, Pzp) by a distance which is greater than a predetermined allowed error distance, sounding an alarm.

3. A method as claimed in claim 1, characterised by the step of: if the actual position (Pxa, Pya, Pza) of said robot arm (3) differs from said predicted position (Pxp, Pyp, Pzp) by a distance which is greater than a predetermined allowed error distance, adjusting the movement of the robot arm (3).

4. A method as claimed in claim 1, characterised by the step of: if the actual position (Pxa, Pya, Pza) of said robot arm (3) differs from said predicted position (Pxp, Pyp, Pzp) by a distance which is greater than a predetermined allowed error distance, stopping movement of the robot arm (3).

5. A method as claimed in claim 1, characterised by the step of: if the actual position (Pxa, Pya, Pza) of said robot arm (3) differs from said predicted position (Pxp, Pyp, Pzp) by a distance which is greater than a predetermined allowed error distance, moving the robot arm (3) to an idle position.

6. A method as claimed in claim 1, characterised by the step of: if the actual position (Pxa, Pya, Pza) of said robot arm (3) differs from said predicted position (Pxp, Pyp, Pzp) by a distance which is greater than a predetermined allowed error distance, reversing the robot arm (3) along its latest path.

7. A method as claimed in claim 2, characterised by the step of: if the actual position (Pxa, Pya, Pza) of said robot arm (3) differs from said predicted position (Pxp, Pyp, Pzp) by a distance which is greater than a predetermined allowed error distance, allowing the robot arm (3) to move freely in one or more directions.

8. A device for controlling the movement of a movable part such as a robot arm (3) in a milking robot (1) comprising control means (7) for controlling the movement of said robot arm (3) from a position from which it starts, to a desired final position (Pxd, Pyd, Pzd), robot arm position detecting means (45, 47, 49) which detect the actual position of said robot arm (3) and which transmits signals corresponding to said actual position (Pxa, Pya, Pza) to said control means (7), characterised in that it further comprises:

a) means for checking if the actual position (Pxa, Pya, Pza) differs from the desired final position (Pxd, Pyd, Pzd) by a distance which is greater than a predetermined distance, b) means for calculating a predicted position (Pxp, Pyp, Pzp), in which the robot arm (3) should be after a selected time interval, as it moves from said actual position (Pxa, Pya, Pza) towards said desired final position (Pxd, Pyd, Pzd), if the actual position (Pxa, Pya, Pza) differs from the desired final position (Pxd, Pyd, Pzd) by a distance which is greater than a predetermined distance, c) means for comparing said predicted position (Pxp, Pyp, Pzp) with the actual position (Pxa, Pya, Pza) after said time interval, and d) means for repeating the check, the calculation and the comparison executed by the means in a)–c) above, if the actual position (Pxa, Pya, Pza) of said robot arm (3) differs from said predicted position (Pxp, Pyp, Pzp) by a distance which is less than a predetermined allowed error distance.

9. A device as claimed in claim 8, characterised in that it further comprises means for sounding an alarm, if the actual position (Pxa, Pya, Pza) of said robot arm (3) differs from said predicted position (Pxp, Pyp, Pzp) by a distance which is greater than a predetermined allowed error distance.

10. A device as claimed in claim 8, characterised in that it further comprises means for adjusting the movement of the robot arm (3), if the actual position (Pxa, Pya, Pza) of said robot arm (3) differs from said predicted position (Pxp, Pyp, Pzp) by a distance which is greater than a predetermined allowed error distance.

11. A device as claimed in claim 8, characterised in that it further comprises means for stopping movement of the robot arm (3), if the actual position (Pxa, Pya, Pza) of said robot arm (3) differs from said predicted position (Pxp, Pyp, Pzp) by a distance which is greater than a predetermined allowed error distance.

12. A device as claimed in claim 8, characterised in that it further comprises means for moving the robot arm (3) to an idle position, if the actual position (Pxa, Pya, Pza) of said robot arm (3) differs from said predicted position (Pxp, Pyp, Pzp) by a distance which is greater than a predetermined allowed error distance.

13. A device as claimed in claim 8, characterised in that it further comprises means for reversing the robot arm (3) along its latest path, if the actual position (Pxa, Pya, Pza) of said robot arm (3) differs from said predicted position (Pxp, Pyp, Pzp) by a distance which is greater than a predetermined allowed error distance.

14. A device as claimed in claim 8, characterised in that it further comprises means for allowing the robot arm (3) to move freely in one or more directions, if the actual position (Pxa, Pya, Pza) of said robot arm (3) differs from said predicted position (Pxp, Pyp, Pzp) by a distance which is greater than a predetermined allowed error distance.

15. A device as claimed in claim 8, characterised in that said control means (7) is a computer (7).

16. A device as claimed in claim 8, characterised in that said means for calculating a predicted position comprises a Kalman filter algorithm.

17. A device as claimed in claim 8, characterised in that it comprises means for determining the required rate of movement for the robot arm (3).

* * * * *